United States Patent
Tang et al.

(10) Patent No.: US 11,103,927 B2
(45) Date of Patent: Aug. 31, 2021

(54) HEAT SINK SUPPORT STRUCTURES IN ADDITIVE MANUFACTURING

(71) Applicant: Siemens Industry Software Inc., Plano, TX (US)

(72) Inventors: Tsz Ling Elaine Tang, Plainsboro, NJ (US); Erhan Arisoy, Princeton, NJ (US); David Madeley, Lincolnshire (GB)

(73) Assignee: Siemens Industry Software Inc., Plano, TX (US)

( * ) Notice: Subject to any disclaimer, the term of this patent is extended or adjusted under 35 U.S.C. 154(b) by 40 days.

(21) Appl. No.: 16/636,591

(22) PCT Filed: Sep. 7, 2017

(86) PCT No.: PCT/US2017/050447
§ 371 (c)(1),
(2) Date: Feb. 4, 2020

(87) PCT Pub. No.: WO2019/050518
PCT Pub. Date: Mar. 14, 2019

(65) Prior Publication Data
US 2021/0162506 A1 Jun. 3, 2021

(51) Int. Cl.
*B22F 10/85* (2021.01)
*B22F 10/43* (2021.01)
(Continued)

(52) U.S. Cl.
CPC .............. *B22F 10/85* (2021.01); *B22F 10/43* (2021.01); *B22F 10/47* (2021.01); *B33Y 50/02* (2014.12);
(Continued)

(58) Field of Classification Search
CPC ...... G05B 19/4099; B22F 10/85; B22F 10/47; B22F 10/43; B22F 10/28; B33Y 50/02; B33Y 10/00
(Continued)

(56) References Cited

U.S. PATENT DOCUMENTS

2015/0352794 A1* 12/2015 Nguyen .................. B22F 10/20
700/98
2016/0086376 A1 3/2016 Tang et al.
2016/0246908 A1* 8/2016 Komzsik ................. B29C 67/00

FOREIGN PATENT DOCUMENTS

WO 2015/184495 A1 12/2015
WO 2017/040248 A1 3/2017

OTHER PUBLICATIONS

EXASIM: "exaSIM Accelerating Production", Jun. 26, 2017, Retrieved from the Internet: URL:https://3dsim.github.io/corporate-site/pdf/exaSIMFlyer21June2017.pdf, retrieved on Nov. 11, 2017, 4 pages.
(Continued)

*Primary Examiner* — Mohammad Ali
*Assistant Examiner* — Joshua T Sanders (57) ABSTRACT

Additive manufacturing methods and corresponding systems and computer-readable mediums. A method includes receiving, by a data processing system, a three-dimensional (3D) model of a product to be manufactured by additive manufacturing. The method includes generating, by the data processing system, a time-based heat map of temperatures of the product during manufacture. The method includes identifying, by the data processing system, hot spots in the heat map where the temperature exceeds a first predetermined threshold. The method includes adding, by the data processing system, heatsink support structures to the 3D model at locations corresponding to the hot spots to produce a modi-
(Continued)

fied 3D model. The method includes storing, by the data processing system, the modified 3D model.

18 Claims, 6 Drawing Sheets

(51) Int. Cl.
*B22F 10/47* (2021.01)
*B33Y 50/02* (2015.01)
*G05B 19/4099* (2006.01)
*B22F 10/28* (2021.01)
*B33Y 10/00* (2015.01)

(52) U.S. Cl.
CPC .......... *G05B 19/4099* (2013.01); *B22F 10/28* (2021.01); *B33Y 10/00* (2014.12); *G05B 2219/35017* (2013.01); *G05B 2219/35134* (2013.01)

(58) Field of Classification Search
USPC .......................................................... 700/98
See application file for complete search history.

(56) References Cited

OTHER PUBLICATIONS

PCT Search Report dated May 17, 2018, for PCT Application No. PCT/US2017/050447, 17 pages.

* cited by examiner

HEAT SINK SUPPORT STRUCTURES IN ADDITIVE MANUFACTURING

TECHNICAL FIELD

The present disclosure is directed, in general, to computer-aided design (CAD), visualization, computer-aided manufacturing (CAM), computer-aided engineering (CAE), product lifecycle management ("PLM") systems, and similar systems, that manage data for products and other items (collectively, "Product Data Management" systems or PDM systems), and in particular to additive manufacturing processes using such systems.

BACKGROUND OF THE DISCLOSURE

Additive manufacturing systems and processes are increasingly useful. Improved systems are desirable.

SUMMARY OF THE DISCLOSURE

Various disclosed embodiments include additive manufacturing methods and corresponding systems and computer-readable mediums. A method includes receiving model of a product to be manufactured by additive manufacturing. The method includes generating of temperatures of the product during manufacture. The method includes identifying in the heat map where the temperature exceeds a predetermined threshold. The method includes adding to the 3D model at locations corresponding to the hot spots to produce a modified 3D model. The method includes storing, by the data processing system, the modified 3D model.

The foregoing has outlined rather broadly the features and technical advantages of the present disclosure so that those skilled in the art may better understand the detailed description that follows. Additional features and advantages of the disclosure will be described hereinafter that form the subject of the claims. Those skilled in the art will appreciate that they may readily use the conception and the specific embodiment disclosed as a basis for modifying or designing other structures for carrying out the same purposes of the present disclosure. Those skilled in the art will also realize that such equivalent constructions do not depart from the spirit and scope of the disclosure in its broadest form.

Before undertaking the DETAILED DESCRIPTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which.

DETAILED DESCRIPTION

FIGS. 1 through 6, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device. The numerous innovative teachings of the present application will be described with reference to exemplary non-limiting embodiments.

During additive manufacturing (AM) (or "printing") of a product, it is often useful to produce support structures that are not part of the final product but provide structural support for the product as the AM process is taking place. Current support structure generation tools for additive manufacturing only consider the geometric characteristics of the object, such as whether there are any down-facing surfaces. Support structures can also act as heat sinks support to divert heat away and reduce thermal distortion during the AM process.

Common additive manufacturing (AM) methods involves a focused energy beam, with either laser or electron beam, to heat and melt powder material, which then cools down and solidifies. Producing downward-facing structures using AM has posed significant challenges since the weight of these structures are unsupported. Support structures, extensions that connect the bottom of the overhangs to the build platform, are often added. The purpose of the support structures is to offer structural support when the overhangs are being printed, and removed after printing. One important additional benefit of these support structures is to help heat dissipation from the heated part during manufacturing. As the object is being manufactured, the higher energy heat source introduces thermal distortion and residual stress. Introducing additional heat transfer channels through support structures (referred to herein as "heat sink support structures") can increase heat dissipation rate and reduce the thermal distortion.

Disclosed embodiments include systems and methods that guide the location of placement of heat sink support structures for effective heat dissipation. Disclosed embodiments can analyze the thermal history of the AM process, such as a temperature map during the AM process, to identify region(s) ("hot spots") that are most prone to being the hottest regions.

Disclosed embodiments can aid in designing support structures that also act as effective heat sinks at hot spots for a given CAD model based on thermal history. Effective placement of heat sink support structure can potentially minimize thermal distortion of the AM process and save material cost.

Disclosed embodiments can identify locations of hot regions for heat sink support generation in additive manufacturing based on the thermal history of the part during the printing process.

Various disclosed processes can analyze a time-varying temperature field (thermal history) of the product during the printing process as well as the 3D CAD model of the product. The thermal history can be obtained, for example, from experimental measurement during the manufacturing process, or from thermal simulation results from finite element analysis (FEA).

Figure 1A:
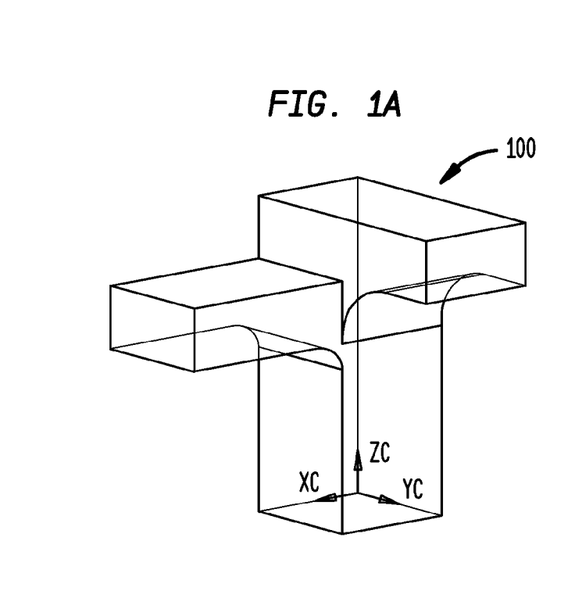
FIG. 1A illustrates CAD views of a model in accordance with disclosed embodiments.
Figure 1B:
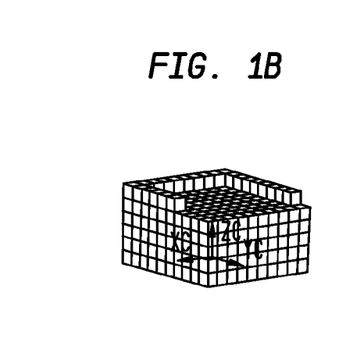
FIGS. 1B-1E illustrate an example of a thermal history obtained from FEA thermal simulation in accordance with disclosed embodiments.
Figure 1C:
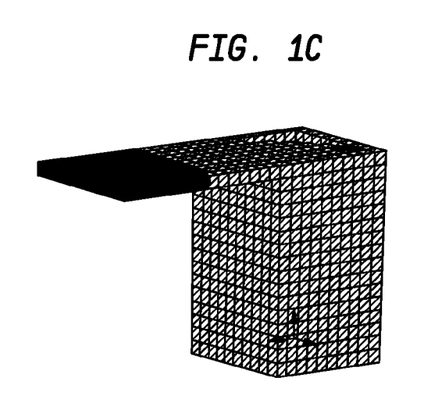
Figure 1D:
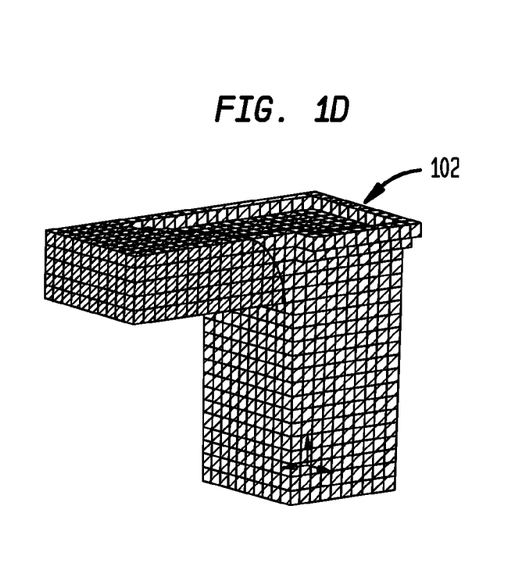
Figure 1E:
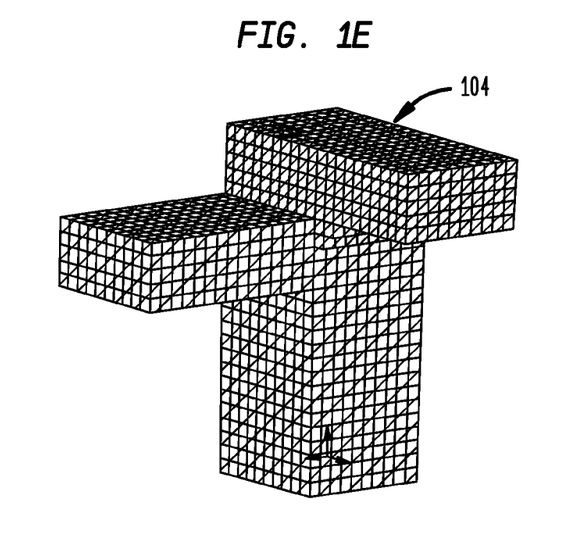

FIG. 1A illustrates CAD views of a model in accordance with disclosed embodiments. FIG. 1A illustrates an original CAD model 100 of a product to be manufactured that can be maintained and displayed by a CAD data processing system.

FIGS. 1B-1E illustrate an example of a thermal history obtained from FEA thermal simulation as performed by a CAD data processing system. Such a simulation simulates the printing of the product throughout the manufacture process (though only four stages are shown here) and the temperature profile of each location of the product at each time.

It is important to note that the models, heat maps, measurements, thresholds, and other aspects of the examples described below are merely illustrative examples, and are non-limiting to the claimed systems and methods.

The temperature value at each location can be represented by different colors, grayscale gradients, crosshatch or other fill patterning, or otherwise. Note that the hotter area is generally found at the uppermost (most-recently-printed) areas, such as area 102, and areas that have no adjacent areas that act as heat sinks, such as area 104.

The system then analyzes the collected thermal history data in time. At each instant, the locations with the top 10% (or any threshold specified by the user) highest temperature value within that particular time instant (the hot spots) are identified. These locations are traced in time, and the number of times that these locations reached the top 10% temperature (or any threshold specified by the user) at each time step is counted.

The system then generates a heat map which represents the cumulative effect of the thermal history at each location.

Figure 2:
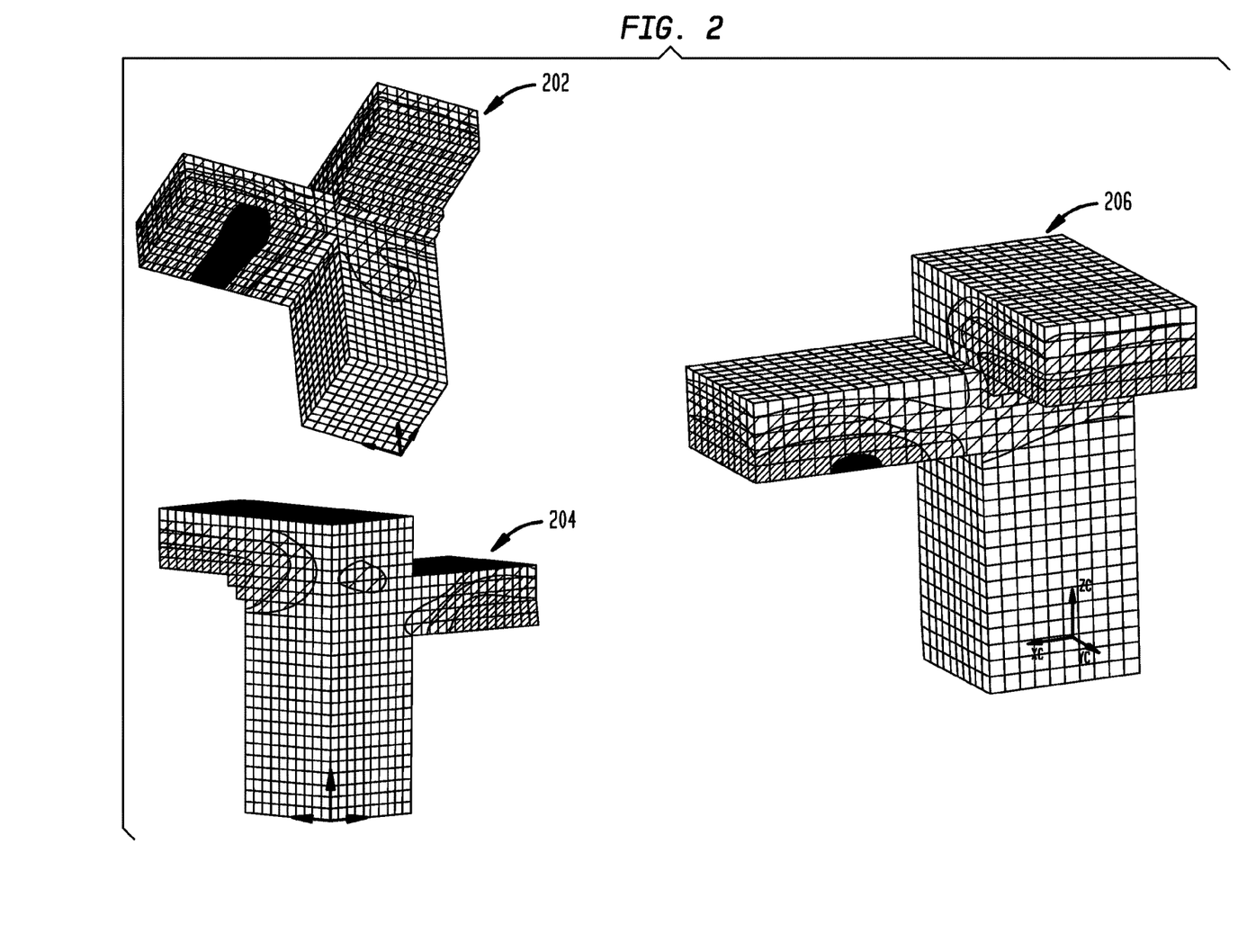
FIG. 2 illustrates an example of 3D time-based heat maps in accordance with disclosed embodiments.

FIG. 2 illustrates an example of 3D time-based heat maps 202, 204, and 206 that correspond to a model 100 and show the cumulative effect of the thermal history. In this figure, the variation in cross-hatching represents the frequency that a particular location reaches top 10% temperature (or any threshold specified by the user) at a particular time instant, but of course color contours, grayscale, any other means of identifying, storing, or displaying this data can be used within the scope of disclosed embodiments.

In the illustrated example of model 100, for regions with higher frequency (e.g., the lower surfaces of the overhang), the cumulative temperature throughout the printing process is higher compared to the rest of the object. Of course, the actual temperatures, frequencies, and locations will differ for each product or model, and this particular example will not apply to other models or products.

Figure 3:
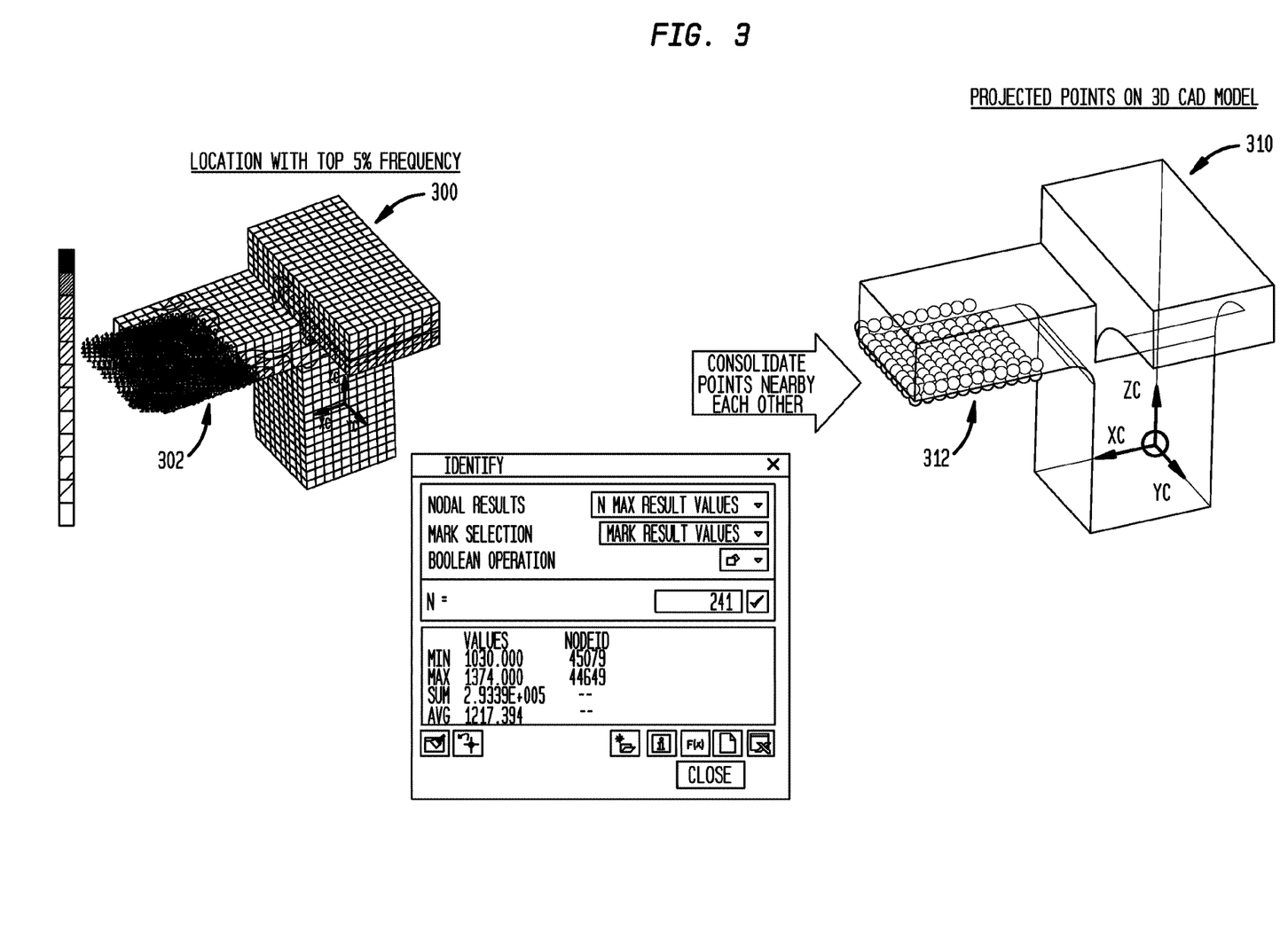
FIG. 3 illustrates a model where the locations with the top hot spot frequency on a heat map are noted in accordance with disclosed embodiments.

FIG. 3 illustrates a model 300 where the locations with the top 5% hot spot frequency on a heat map are noted, shown as hot spots 302. Of course, 5% is an exemplary threshold that can be adjusted as desired. These locations are either on the outer surface or within the volume of the object. The system consolidates the hot spot locations near each other and projects them as hot spot points 312 on the outer surface of 3D CAD model 310.

The system then adds, to the CAD model, one or more heatsink support structures at the hotspot points. These heatsink support structures may or may not provide substantial structural support, but their placement serves to moderate the temperatures of the hot spots and reduce distortion in the manufactured product.

Figure 4A:
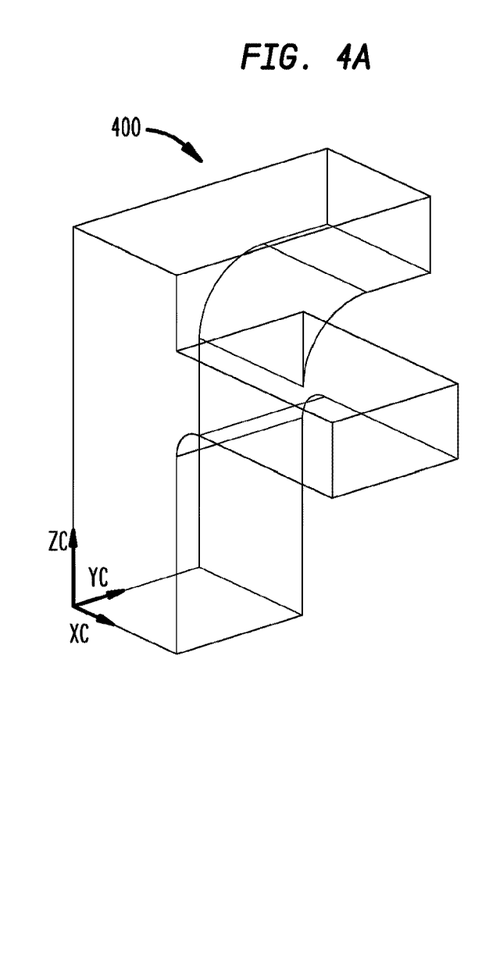
FIG. 4A illustrates an example of a CAD model with no heatsink support structure.
Figure 4B:
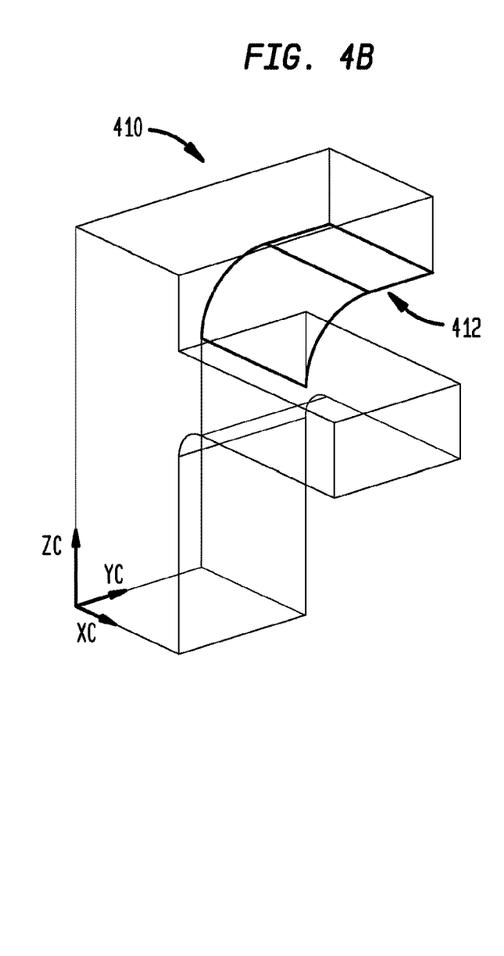
FIG. 4B illustrates an example of a CAD model with support structures added at a location other than the identified hotspot locations.
Figure 4C:
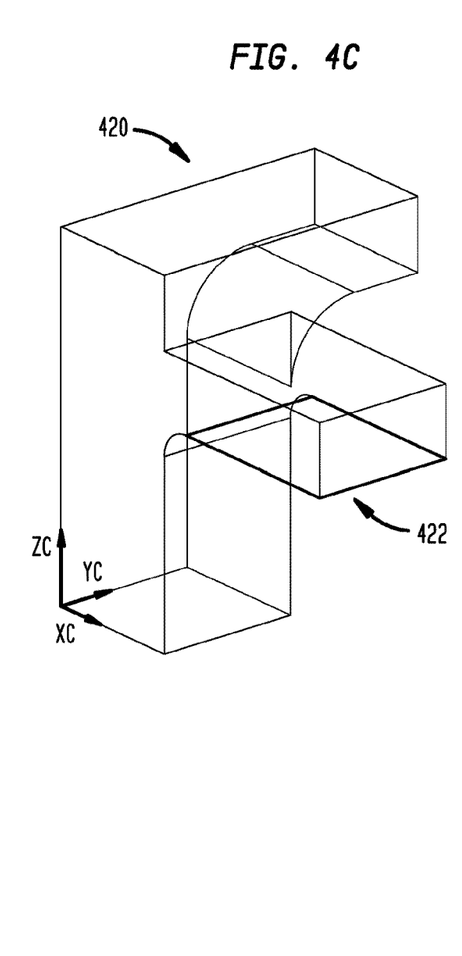
FIG. 4C illustrates an example of a modified CAD model with heatsink support structures added at identified hotspot locations, in accordance with disclosed embodiments.

FIGS. 4A-4C illustrate a non-limiting example of improvements provided by disclosed techniques in a specific use case.

FIG. 4A illustrates an example of a CAD model 400 with no heatsink support structure. This example, in FEA testing, shows a temperature range of 658-1223° C. and a maximum distortion value of 0.568 mm.

FIG. 4B illustrates an example of a CAD model 410 with support structures 412 added at a location other than the identified hotspot locations. This example, in FEA testing, shows a temperature range of 620-1173° C. and a maximum distortion value of 0.568 mm.

FIG. 4C illustrates an example of a modified CAD model 420 with heatsink support structures 422 added at identified hotspot locations, in accordance with disclosed embodiments. This example, in FEA testing, shows a temperature range of 548-1152° C. and a maximum distortion value of 0.522 mm; a significant improvement over either the original CAD model or the CAD model with support structures placed in other locations. The instantaneous temperature and the resulting thermal distortion is reduced by effective placement of heat sink support structures at locations in accordance with disclosed embodiments.

As disclosed herein, the regions that have the top 5% frequency (this threshold can be adjusted by the user) of being "hot spots" are identified. These regions can be on the outer surface of the object, but can also be within the volume of the object as described above. Since heat sink supports are to be placed on the outer surface of the object, these hot spots are projected onto the outer surface of the CAD model, to the closest point on the projected surface. Nearby projected points are combined. The resulting hot spot projection on the CAD model is obtained. These projected points can then be used as a guideline for addition of heat sink support structures, for effective dissipation of thermal energy from the hot region during the printing process.

Figure 5:
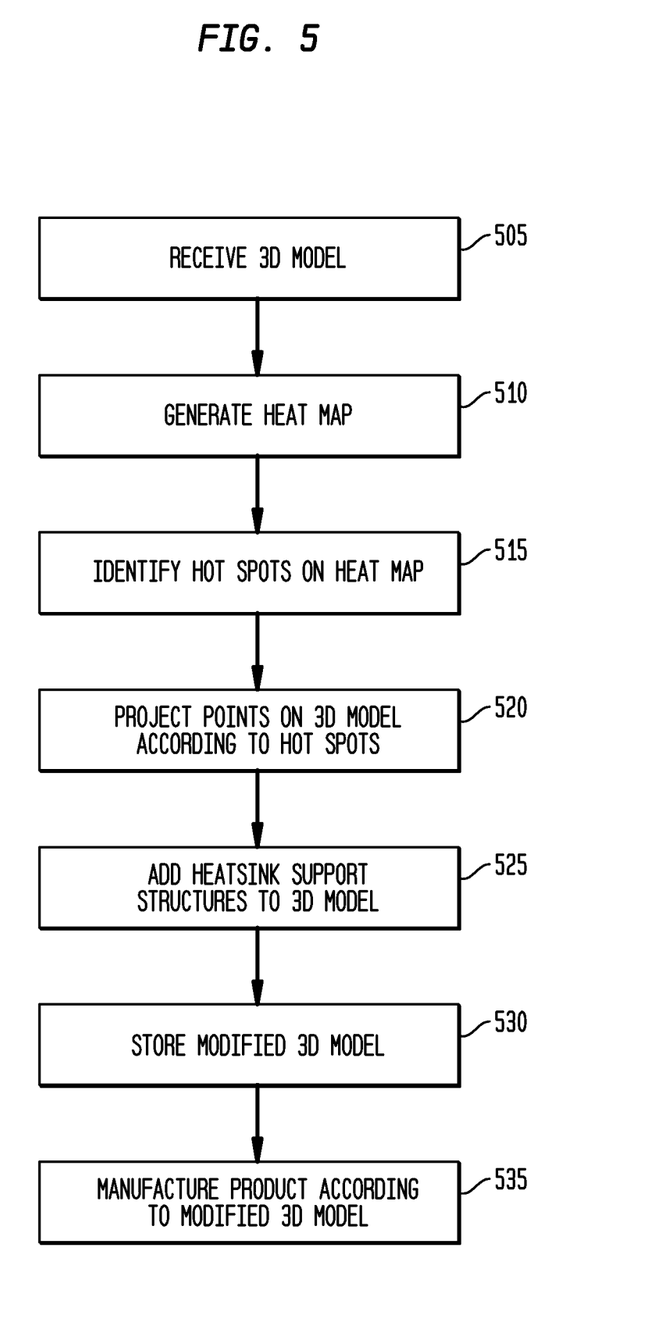
FIG. 5 illustrates a flowchart of a process in accordance with disclosed embodiments.

FIG. 5 illustrates a flowchart of a process in accordance with disclosed embodiments. Such a process can be performed by one or more CAD data processing systems or other data processing system as disclosed herein, referred to generically below as the "system."

The system receives a 3D model of a product to be manufactured by additive manufacturing (505). "Receiving," as used herein, can include loading from storage, receiving from another device or process, receiving via an interaction with a user, or otherwise.

The system generates a time-based heat map of temperatures of the product during manufacture (510). The heat map can be generated using a finite element analysis simulation, as understood by those of skill in the art, or can be generated by manufacturing the product and measuring the temperatures of the product during manufacture. Note that while graphical displays of heat maps are used above for illustration, not all embodiments require the heat map to be displayed and this process can be performed while maintaining the heat map as a data structure of temperature values of time/temperature values.

The system identifies hot spots in the heat map where the temperature exceeds a first predetermined threshold (515). The first threshold can be, for example within 5% or 10% of the maximum temperature values represented by the heat map. This step can include identifying the hot spots that exceed the first predetermined threshold with a frequency exceeding a second predetermined threshold; for example, the identified hot spots can be the 5% most frequent hot spots that exceed a top-10% temperature threshold.

The system projects points on the surface of the 3D model according to the hot spots (520). This can include combining adjacent hot spots into combined points.

The system adds heatsink support structures to the 3D model at locations corresponding to the hot spots to produce a modified 3D model (525).

The system stores the modified 3D model (530). The modified 3D model is usable for manufacturing the product to reduce distortion because of the addition of the heatsink support structures.

The product can be manufactured according to the modified 3D model (535).

Figure 6:
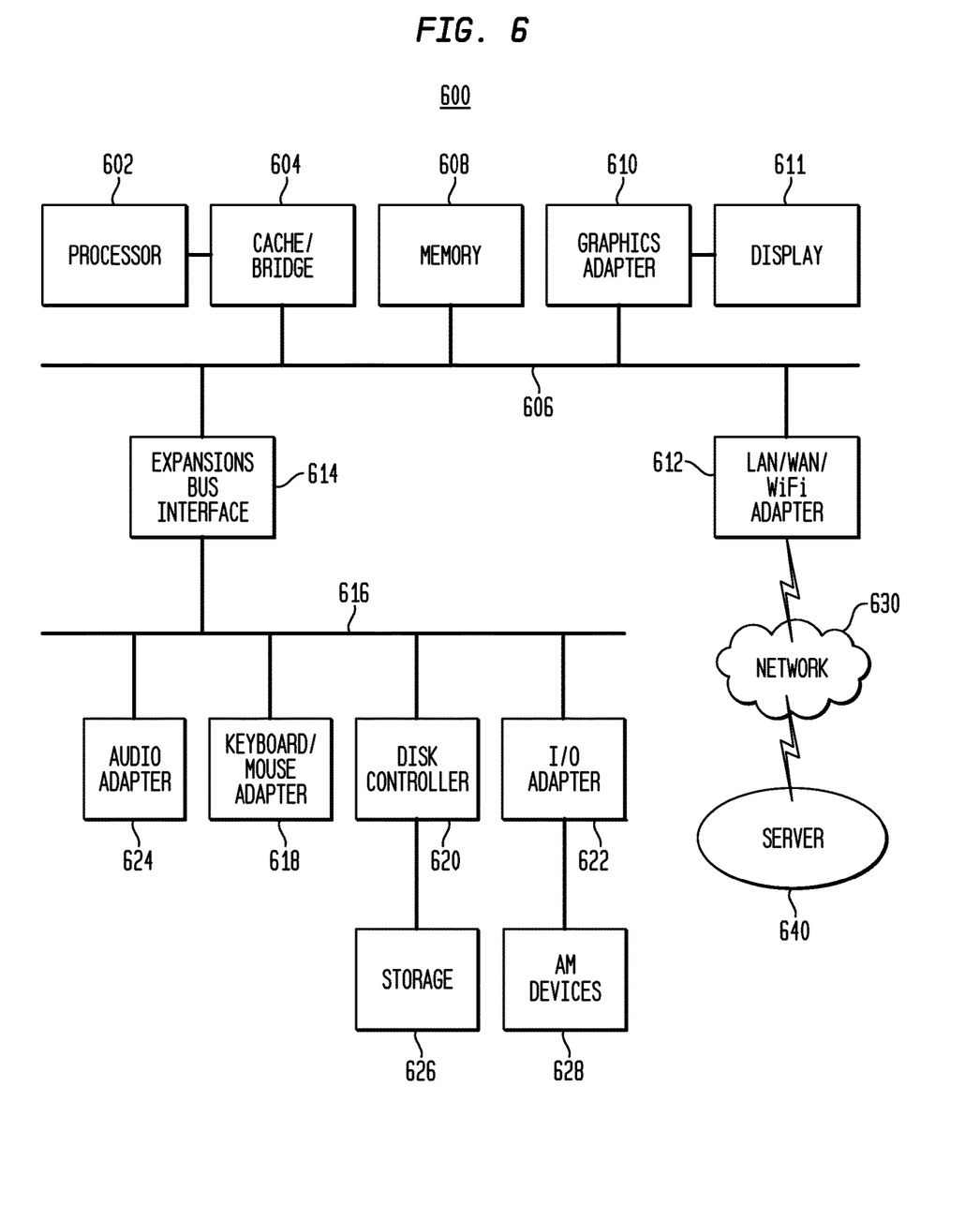
FIG. 6 illustrates a block diagram of a data processing system in which an embodiment can be implemented.

FIG. 6 illustrates a block diagram of a data processing system in which an embodiment can be implemented, for example as a PDM system particularly configured by software or otherwise to perform the processes as described herein, and in particular as each one of a plurality of interconnected and communicating systems as described herein. The data processing system depicted includes a processor 602 connected to a level two cache/bridge 604, which is connected in turn to a local system bus 606. Local system bus 606 may be, for example, a peripheral component interconnect (PCI) architecture bus. Also connected to local system bus in the depicted example are a main memory 608 and a graphics adapter 610. The graphics adapter 610 may be connected to display 611.

Other peripherals, such as local area network (LAN)/Wide Area Network/Wireless (e.g. WiFi) adapter 612, may also be connected to local system bus 606. Expansion bus interface 614 connects local system bus 606 to input/output (I/O) bus 616. I/O bus 616 is connected to keyboard/mouse adapter 618, disk controller 620, and I/O adapter 622. Disk controller 620 can be connected to a storage 626, which can be any suitable machine usable or machine readable storage medium, including but not limited to nonvolatile, hard-coded type mediums such as read only memories (ROMs) or erasable, electrically programmable read only memories (EEPROMs), magnetic tape storage, and user-recordable type mediums such as floppy disks, hard disk drives and compact disk read only memories (CD-ROMs) or digital versatile disks (DVDs), and other known optical, electrical, or magnetic storage devices.

Also connected to I/O bus 616 in the example shown is audio adapter 624, to which speakers (not shown) may be connected for playing sounds. Keyboard/mouse adapter 618 provides a connection for a pointing device (not shown), such as a mouse, trackball, trackpointer, touchscreen, etc. I/O adapter 622 can be connected to interact with AM device 628, which can include any physical devices, sensors, controllers, or other equipment used for manufacturing the product, measuring temperatures of the product, or performing other physical processes as described herein.

Those of ordinary skill in the art will appreciate that the hardware depicted in FIG. 6 may vary for particular implementations. For example, other peripheral devices, such as an optical disk drive and the like, also may be used in addition or in place of the hardware depicted. The depicted example is provided for the purpose of explanation only and is not meant to imply architectural limitations with respect to the present disclosure.

A data processing system in accordance with an embodiment of the present disclosure includes an operating system employing a graphical user interface. The operating system permits multiple display windows to be presented in the graphical user interface simultaneously, with each display window providing an interface to a different application or to a different instance of the same application. A cursor in the graphical user interface may be manipulated by a user through the pointing device. The position of the cursor may be changed and/or an event, such as clicking a mouse button, generated to actuate a desired response.

One of various commercial operating systems, such as a version of Microsoft Windows™, a product of Microsoft Corporation located in Redmond, Wash. may be employed if suitably modified. The operating system is modified or created in accordance with the present disclosure as described.

LAN/WAN/Wireless adapter 612 can be connected to a network 630 (not a part of data processing system 600), which can be any public or private data processing system network or combination of networks, as known to those of skill in the art, including the Internet. Data processing system 600 can communicate over network 630 with server system 640, which is also not part of data processing system 600, but can be implemented, for example, as a separate data processing system 600.

Of course, those of skill in the art will recognize that, unless specifically indicated or required by the sequence of operations, certain steps in the processes described above may be omitted, performed concurrently or sequentially, or performed in a different order.

Those skilled in the art will recognize that, for simplicity and clarity, the full structure and operation of all data processing systems suitable for use with the present disclosure is not being depicted or described herein. Instead, only so much of a data processing system as is unique to the present disclosure or necessary for an understanding of the present disclosure is depicted and described. The remainder of the construction and operation of data processing system 600 may conform to any of the various current implementations and practices known in the art.

It is important to note that while the disclosure includes a description in the context of a fully functional system, those skilled in the art will appreciate that at least portions of the mechanism of the present disclosure are capable of being distributed in the form of instructions contained within a machine-usable, computer-usable, or computer-readable medium in any of a variety of forms, and that the present disclosure applies equally regardless of the particular type of instruction or signal bearing medium or storage medium utilized to actually carry out the distribution. Examples of machine usable/readable or computer usable/readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs).

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, step, or function is an essential element which must be included in the claim scope: the scope of patented subject matter is defined only by the allowed claims. Moreover, none of these claims are intended to invoke 35 USC § 112(f) unless the exact words "means for" are followed by a participle. The use of terms such as (but not limited to) "mechanism," "module," "device," "unit," "component," "element," "member," "apparatus," "machine," "system," "processor," or "controller," within a claim is understood and intended to refer to structures known to those skilled in the relevant art, as further modified or enhanced by the features of the claims themselves, and is not intended to invoke 35 U.S.C. § 112(f).

What is claimed is:

1. A method performed by a data processing system, comprising:
    receiving, by the data processing system, a three-dimensional (3D) model of a product to be manufactured by additive manufacturing;
    generating, by the data processing system, a time-based heat map of temperatures of the product during manufacture;
    identifying, by the data processing system, hot spots in the heat map where the temperature exceeds a first predetermined threshold;
    adding, by the data processing system, heatsink support structures to the 3D model at locations corresponding to the hot spots to produce a modified 3D model; and
    storing, by the data processing system, the modified 3D model;
    wherein the identified hot spots in the heat map represent locations where the temperature exceeds the first predetermined threshold at a frequency that exceeds a second predetermined threshold.

2. The method of claim 1, wherein the time-based heat map is generated using a finite element analysis simulation.

3. The method of claim 1, wherein the time-based heat map is generated by manufacturing the product according to the 3D model and measuring temperatures during the manufacture.

4. The method of claim 1, further comprising projecting points on the surface of the 3D model corresponding to the hot spots.

5. The method of claim 1, wherein the first predetermined threshold is relative to a maximum temperature represented by the heat map.

6. The method of claim 1, further comprising manufacturing the product according to the modified 3D model.

7. A data processing system comprising:
    a processor; and
    an accessible memory, the data processing system particularly configured to receive a three-dimensional model of a product to be manufactured by additive manufacturing;
    generate time-based heat map of temperatures of the product during manufacture;
    identify hot spots in the heat map where the temperature exceeds a first predetermined threshold;
    add heatsink support structures to the 3D model at locations corresponding to the hot spots to produce a modified 3D model; and
    store the modified 3D model;
    wherein the identified hot spots in the heat map represent locations where the temperature exceeds the first predetermined threshold at a frequency that exceeds a second predetermined threshold.

8. The data processing system of claim 7, wherein the time-based heat map is generated using a finite element analysis simulation.

9. The data processing system of claim 7, wherein the time-based heat map is generated by manufacturing the product according to the 3D model and measuring temperatures during the manufacture.

10. The data processing system of claim 7, wherein the data processing system is further configured to project points on the surface of the 3D model corresponding to the hot spots.

11. The data processing system of claim 7, wherein the first predetermined threshold is relative to a maximum temperature represented by the heat map.

12. The data processing system of claim 7, wherein the data processing system is further configured to manufacture the product according to the modified 3D model.

13. A non-transitory computer-readable medium encoded with executable instructions that, when executed, cause one or more data processing systems to:
    receive a three-dimensional model of a product to be manufactured by additive manufacturing;
    generate time-based heat map of temperatures of the product during manufacture;
    identify hot spots in the heat map where the temperature exceeds a first predetermined threshold;
    add heatsink support structures to the 3D model at locations corresponding to the hot spots to produce a modified 3D model; and
    store the modified 3D model;
    wherein the identified hot spots in the heat map represent locations where the temperature exceeds the first predetermined threshold at a frequency that exceeds a second predetermined threshold.

14. The non-transitory computer-readable medium of claim 13, wherein the time-based heat map is generated using a finite element analysis simulation.

15. The non-transitory computer-readable medium of claim 13, wherein the time-based heat map is generated by manufacturing the product according to the 3D model and measuring temperatures during the manufacture.

16. The non-transitory computer-readable medium of claim 13, wherein the executable instructions further cause the one or more data processing systems to project points on the surface of the 3D model corresponding to the hot spots.

17. The non-transitory computer-readable medium of claim 13, wherein the first predetermined threshold is relative to a maximum temperature represented by the heat map.

18. The non-transitory computer-readable medium of claim 13, wherein the executable instructions further cause the one or more data processing systems to manufacture the product according to the modified 3D model.

\* \* \* \* \*